(12) United States Patent
Chang

(10) Patent No.: US 11,350,323 B2
(45) Date of Patent: May 31, 2022

(54) MOBILE COMMUNICATION NETWORK SWITCHING METHOD, APPARATUS, USER EQUIPMENT AND STORAGE MEDIUM

(71) Applicant: GREE ELECTRIC APPLIANCES, INC. OF ZHUHAI, Zhuhai (CN)

(72) Inventor: Biao Chang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 17/052,296

(22) PCT Filed: Dec. 21, 2018

(86) PCT No.: PCT/CN2018/122875
§ 371 (c)(1),
(2) Date: Nov. 2, 2020

(87) PCT Pub. No.: WO2020/062648
PCT Pub. Date: Apr. 2, 2020

(65) Prior Publication Data
US 2021/0243658 A1    Aug. 5, 2021

(30) Foreign Application Priority Data

Sep. 25, 2018 (CN) .......................... 201811113590.3

(51) Int. Cl.
*H04W 4/00*  (2018.01)
*H04W 36/00* (2009.01)
(Continued)

(52) U.S. Cl.
CPC ...... *H04W 36/0058* (2018.08); *H04B 17/318* (2015.01); *H04W 24/08* (2013.01);
(Continued)

(58) Field of Classification Search
None
See application file for complete search history.

(56) References Cited

U.S. PATENT DOCUMENTS 6,400,951 B1 * 6/2002 Vaara .................... H04W 48/16
455/436
8,717,894 B2 * 5/2014 Zhang ................... H04J 3/0664
370/235
(Continued)

FOREIGN PATENT DOCUMENTS

CN      101925108 A     12/2010
CN      104424028 A      3/2015
(Continued)

OTHER PUBLICATIONS

International Search Report for corresponding application PCT/CN2018/122875 filed Dec. 12, 2018; dated Jun. 12, 2019.

*Primary Examiner* — Amancio Gonzalez
(74) *Attorney, Agent, or Firm* — Cantor Colburn LLP

(57) ABSTRACT

A mobile communication network switching method, device, UE and storage medium are provided. The method includes that: a measurement configuration message sent by a base station is received, candidate frequency points are measured to obtain a signal strength parameter of each candidate frequency point, and at least one candidate frequency point meeting a switching condition is determined; a signal strength parameter of a mobile communication signal of a current frequency point is monitored when in a call state; when the signal strength parameter meets a preset condition, a signal strength parameter of the at least one candidate frequency point meeting the switching condition is increased in the same trend, and report information of the at least one candidate frequency point is reported to the base station; and a switching instruction fed back by the base (Continued)

station is received, and a network switching operation is performed according to the switching instruction.

19 Claims, 5 Drawing Sheets

(51) Int. Cl.
    *H04B 17/318*     (2015.01)
    *H04W 24/08*     (2009.01)
    *H04W 36/30*     (2009.01)
    *H04W 36/32*     (2009.01)

(52) U.S. Cl.
    CPC ..... *H04W 36/00837* (2018.08); *H04W 36/30* (2013.01); *H04W 36/32* (2013.01)

(56) References Cited

U.S. PATENT DOCUMENTS

| | | | | |
|---|---|---|---|---|
| 8,996,009 | B2* | 3/2015 | Li | H04W 36/0061 |
| | | | | 455/436 |
| 10,887,842 | B2* | 1/2021 | Fu | H04W 80/08 |
| 2010/0075684 | A1* | 3/2010 | Iwamura | H04W 48/12 |
| | | | | 455/449 |
| 2011/0070880 | A1* | 3/2011 | Song | H04W 36/08 |
| | | | | 455/423 |
| 2013/0301439 | A1* | 11/2013 | Heo | H04W 56/001 |
| | | | | 370/252 |
| 2015/0249933 | A1* | 9/2015 | Huang | H04W 76/27 |
| | | | | 370/252 |
| 2015/0365865 | A1 | 12/2015 | Belschner | |
| 2016/0080061 | A1* | 3/2016 | Yang | H04B 7/0456 |
| | | | | 375/267 |
| 2018/0132157 | A1* | 5/2018 | Yang | H04W 36/305 |
| 2020/0328776 | A1* | 10/2020 | Scholand | H04B 1/715 |

FOREIGN PATENT DOCUMENTS

| | | |
|---|---|---|
| CN | 107889145 A | 4/2018 |
| CN | 108401520 A | 8/2018 |
| CN | 108924890 A | 11/2018 |

* cited by examiner

MOBILE COMMUNICATION NETWORK SWITCHING METHOD, APPARATUS, USER EQUIPMENT AND STORAGE MEDIUM

RELATED APPLICATION

The present disclosure claims priority to Chinese Patent Application No. 201811113590.3, filed on Sep. 25, 2018 and entitled "Mobile Communication Network Switching Method, Apparatus, User Equipment and Storage Medium", the disclosure of which is hereby incorporated by reference in its entirety.

TECHNICAL FIELD

The present disclosure relates to the technical field of mobile communications, and in particular to a mobile communication network switching method, apparatus, User Equipment (UE) and storage medium.

BACKGROUND

For UE that a phone card can be plugged in to make a call through a mobile communication network, such as mobile phones or wearable smart devices, the quality of a mobile communication signal directly affects the quality of the call, and the call may be disconnected due to the poor mobile communication signal.

In traditional technologies, when the poor quality of the mobile communication signal at a current frequency point is detected, a measurement event is triggered, and a base station (such as eNB) controls the UE to measure and switch from the current frequency point to another frequency point with good signal quality, so as to realize network switching. However, it takes a certain time period for the network switching. In addition, since the UE may move, and when the UE moves to an area with a worse mobile network signal, a mobile communication signal of the UE will change dramatically, which is prone to cause a Radio Link Failure (RLF) before a switching process is completed, and the call quality is poor.

SUMMARY

A mobile communication network switching method is provided, which includes the following steps.

A measurement configuration message sent by a base station is received, candidate frequency points corresponding to a measurement object identifier in the measurement configuration message are measured to obtain a signal strength parameter of each candidate frequency point, and at least one candidate frequency point meeting a switching condition in the measurement configuration message is determined.

A signal strength parameter of a mobile communication signal of a current frequency point is monitored when in a call state.

When the signal strength parameter of the mobile communication signal meets a preset condition, a signal strength parameter of the at least one candidate frequency point meeting the switching condition is increased, according to a strength change trend of the mobile communication signal, in the same trend.

Report information of the at least one candidate frequency point meeting the switching condition is reported to the base station, the report information including the measurement object identifier and the signal strength parameter increased in the same trend.

A switching instruction fed back by the base station according to the report information is received, and a network switching operation is performed according to the switching instruction.

A mobile communication network switching apparatus is further provided, which includes a frequency point measuring component, a strength monitoring component, a parameter adjusting component, an information reporting component, and a network switching component.

The frequency point measuring component is configured to receive the measurement configuration message sent by the base station, measure the candidate frequency points corresponding to the measurement object identifier in the measurement configuration message to obtain a signal strength parameter of each candidate frequency point, and determine at least one candidate frequency point meeting the switching condition in the measurement configuration message.

The strength monitoring component is configured to monitor the signal strength parameter of the mobile communication signal of the current frequency point when in the call state.

The parameter adjusting component is configured to increase, when the signal strength parameter of the mobile communication signal meets a preset condition, a signal strength parameter of the at least one candidate frequency point meeting the switching condition in the same trend according to the strength change trend of the mobile communication signal.

The information reporting component is configured to report the report information of the at least one candidate frequency point meeting the switching condition to the base station, the report information including the measurement object identifier and the signal strength parameter increased in the same trend.

The network switching component is configured to receive the switching instruction fed back by the base station, the switching instruction being determined, by the base station, according to the report information, and perform the network switching operation according to the switching instruction.

UE is provided, which includes a memory and a processor. The memory stores a computer program. When executing the computer program, the processor implements the following steps.

The measurement configuration message sent by the base station is received, the candidate frequency points corresponding to the measurement object identifier in the measurement configuration message are measured, the signal strength parameter of each candidate frequency point is obtained, and the candidate frequency points meeting the switching condition in the measurement configuration message are determined.

The signal strength parameter of the mobile communication signal of the current frequency point is monitored when in the call state.

When the signal strength parameter of the mobile communication signal meets the preset condition, according to the strength change trend of the mobile communication signal, the signal strength parameters of the candidate frequency points meeting the switching condition are increased in the same trend.

The report information of the candidate frequency points meeting the switching condition is reported to the base station, the report information including the measurement object identifier and the signal strength parameter increased in the same trend.

The switching instruction fed back by the base station according to the report information is received, and the network switching operation is performed according to the switching instruction.

A computer-readable storage medium is provided, which stores a computer program. When executed by a processor, the computer program implements the following steps.

A measurement configuration message sent by a base station is received, candidate frequency points corresponding to a measurement object identifier in the measurement configuration message are measured to obtain a signal strength parameter of each candidate frequency point, and at least one candidate frequency point meeting a switching condition in the measurement configuration message is determined.

A signal strength parameter of a mobile communication signal of a current frequency point is monitored when in a call state.

When the signal strength parameter of the mobile communication signal meets a preset condition, a signal strength parameters of the at least one candidate frequency point meeting the switching condition is increased, according to a strength change trend of the mobile communication signal, in the same trend.

Report information of the at least one candidate frequency point meeting the switching condition is reported to the base station, the report information including the measurement object identifier and the signal strength parameter increased in the same trend.

A switching instruction fed back by the base station according to the report information is received, and a network switching operation is performed according to the switching instruction.

DETAILED DESCRIPTION

For making the purpose, the technical solutions and the advantages of the present disclosure clearer, the present disclosure is further elaborated below in combination with the accompanying drawings and embodiments. It should be understood that the specific embodiments described here are used for interpreting the present disclosure and not intended to limit the present disclosure.

Figure 1:
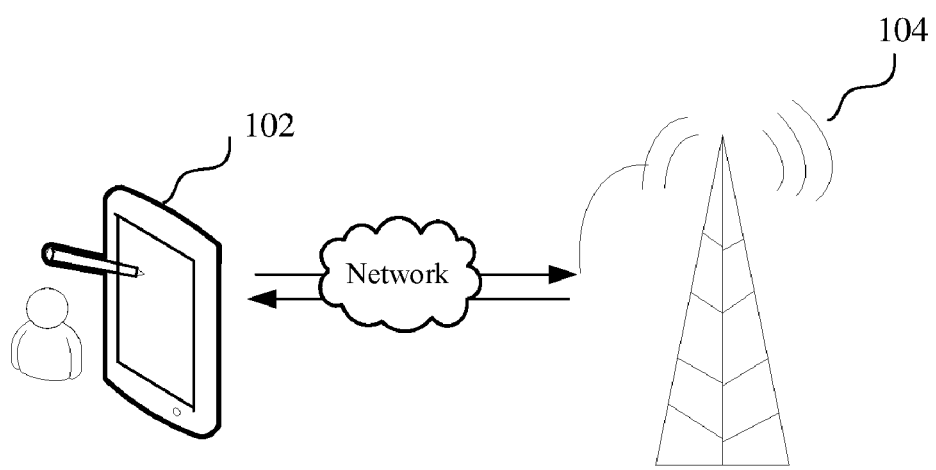
FIG. 1 is an application environment diagram of a mobile communication network switching method according to an embodiment of the present disclosure.

A mobile communication network switching method provided by the present disclosure may be applied in the application environment as shown in FIG. 1. UE 102 communicates with a base station 104 through a mobile communication network. The UE 102 receives a measurement configuration message sent by the base station 104, measures candidate frequency points corresponding to a measurement object identifier in the measurement configuration message to obtain a signal strength parameter of each candidate frequency point, and determines at least one candidate frequency point meeting a switching condition in the measurement configuration message. The UE 102 monitors the signal strength parameter of a mobile communication signal of a current frequency point when in a call state, when the signal strength parameter of the mobile communication signal meets a preset condition, increases, according to a strength change trend of the mobile communication signal, the signal strength parameter of the at least one candidate frequency points meeting the switching condition in the same trend, and reports report information of the at least one candidate frequency point meeting the switching condition to the base station 104. The report information includes the measurement object identifier and the signal strength parameter increased in the same trend. The base station 104 sends a switching instruction to the UE 102 after receiving the report information. The UE 102 receives the switching instruction fed back by the base station 104, and performs a network switching operation according to the switching instruction. The UE 102 may be, but is not limited to, a variety of smart phones, tablets and portable wearable devices that make calls based on mobile communication networks.

Figure 2:
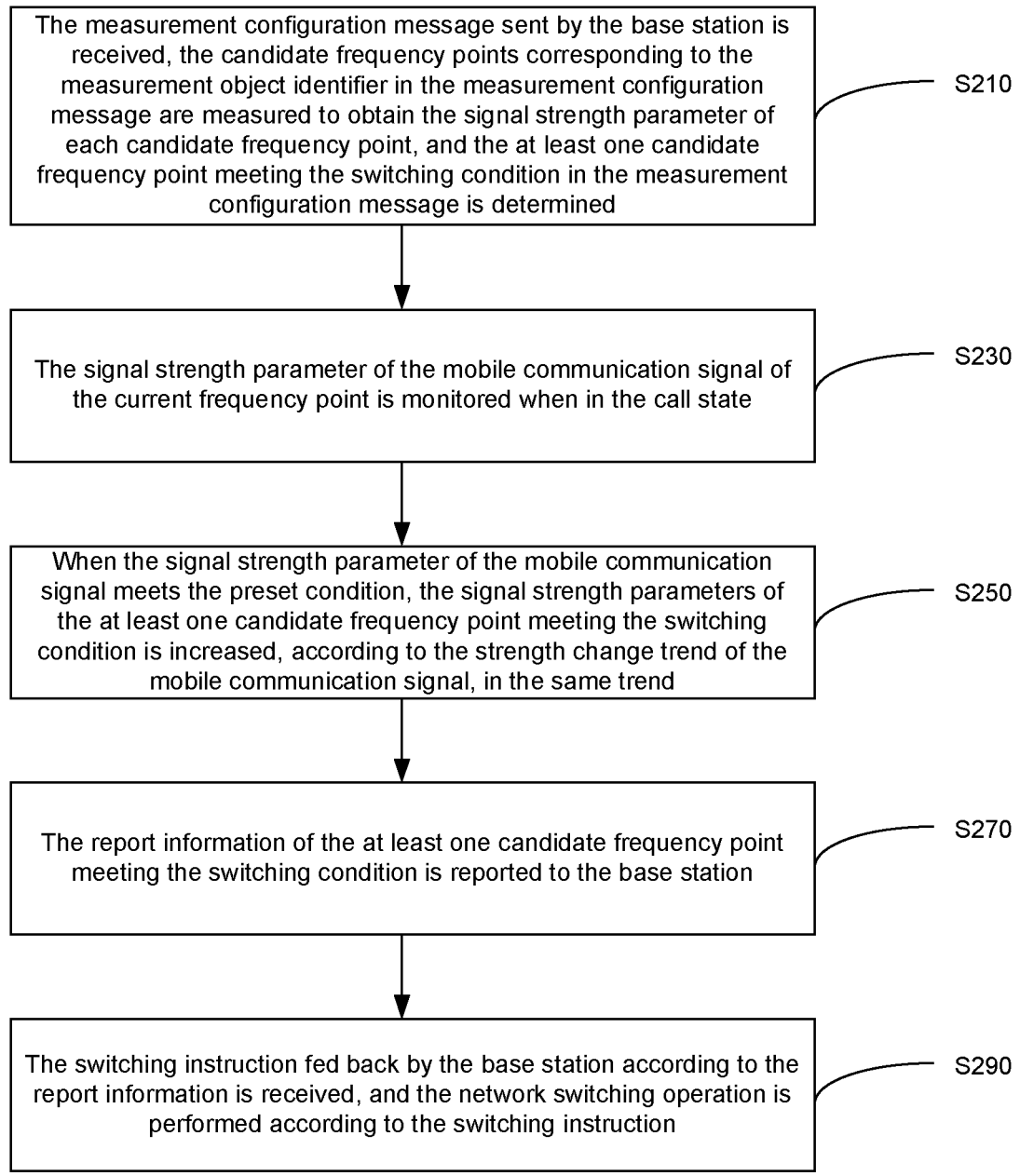
FIG. 2 is a flowchart of a mobile communication network switching method according to an embodiment of the present disclosure.

In some embodiments, as shown in FIG. 2, a mobile communication network switching method is provided. Illustrated by the application of the method to the UE 102 in FIG. 1, the mobile communication network switching method includes the following steps.

At S210, the measurement configuration message sent by the base station is received, the candidate frequency points corresponding to the measurement object identifier in the measurement configuration message are measured to obtain the signal strength parameter of each candidate frequency point, and the at least one candidate frequency point meeting the switching condition in the measurement configuration message is determined.

After the UE completes cell residency, the base station issues the measurement configuration message to the UE. The measurement configuration message is the massage used for controlling the UE to perform measurement, including the measurement object identifier and the switching condition. The measurement object identifier is used for indicating a measurement object, namely each candidate frequency point. The switching condition is a limiting condition reported to the base station after measured by the UE.

Specifically, the base station notifies the measurement configuration message to the UE through a measConfig cell carried by an RRCConnectionReconfigurtion message. The UE performs measurement according to the received measurement configuration message, specifically measures a current service cell, and determines according to a s-Measure cell in the RRCConnectionReconfigurtion message whether it is necessary to perform measurement to neighboring cells, and then may obtain the signal strength parameter of each candidate frequency point and the at least one candidate frequency point meeting the switching condition.

Specifically, the measurement of the candidate frequency points by the UE includes intra-frequency measurement and inter-frequency measurement. Based on existing communication protocols, in a connection state: for the intra-frequency measurement, there is no conflict between the measurement and data reception, and the UE always listens to a main carrier and performs the measurement without any adjustment; for the inter-frequency measurement, the UE does not have multiple reception capabilities, so it is impossible to send and receive the service cell at the same time, and in order to make the UE prepare for switching, the service cell needs to arrange some gap to the UE for inter-frequency and inter-system measurement.

At S230, the signal strength parameter of the mobile communication signal of the current frequency point is monitored when in the call state.

Information of a voice call between two pieces of UE is transmitted based on a certain specific frequency point. The current frequency point is the frequency point at which the current call of the UE carries out information transmission. The signal strength parameter is the parameter used for representing signal strength. An operation of monitoring, by the UE, the signal strength parameter of the mobile communication signal acquires the signal strength parameter of the mobile communication signal in real time or at intervals.

Specifically, the UE determines whether it is in a call state by determining whether a service channel has voice data transmission, or determines whether it is in a call state through an application layer based on a principle that any call is displayed at the application layer. The UE calls data of a program component to obtain the signal strength parameter of the mobile communication signal at the current frequency point, the program component being the component that measures the signal strength of the mobile communication signal.

At S250, when the signal strength parameter of the mobile communication signal meets the preset condition, the signal strength parameters of the at least one candidate frequency point meeting the switching condition is increased, according to the strength change trend of the mobile communication signal, in the same trend.

The preset condition is set according to actual needs, specifically according to the needs of switching the mobile communication network. The strength of the mobile communication signal may enhance and weaken, that is, a strength change trend of the mobile communication signal includes two trends of strengthening and weakening. When the strength of the mobile communication signal enhances, the corresponding signal strength parameter increases. When the strength of the mobile communication signal weakens, the corresponding signal strength parameter decreases. The mobile communication network switching method provided by the present disclosure is used for realizing network switching under the condition of poor network quality, so the trend of weakening of the mobile communication signal is taken into account. The operation that the signal strength parameter of the at least one candidate frequency point meeting the switching condition is increased in the same trend means that when the strength of the mobile communication signal weakens, the signal strength parameter of the at least one candidate frequency point meeting the switching condition is further decreased.

At S270, the report information of the at least one candidate frequency point meeting the switching condition is reported to the base station.

After completing measurement, the UE fills a measurement result in a MeasurementReport message and sends the MeasurementReport message to the base station. The measurement result includes the measurement object identifier, the signal strength parameter corresponding to the measurement object identifier, and other data. In some embodiments, the report information is the information representing the measurement result, including the measurement object identifier and the signal strength parameter increased in the same trend. The UE reports the measurement object identifier of the at least one candidate frequency point meeting the switching condition and the signal strength parameter increased in the same trend corresponding to the at least one candidate frequency point meeting the switching condition to the base station, so that the base station performs switching determination.

Since the signal strength parameter of the at least one candidate frequency point meeting the switching condition is increased in the same trend, when the strength of the mobile communication signal weakens, the signal strength parameter reported to the base station will further weaken compared with the actually measured signal strength parameter. For the weak mobile communication signal considered in the present disclosure, a switching threshold is generally that the signal strength parameter is less than a set threshold. Through increasing the reported signal strength parameter in the same trend, the reported signal strength parameter further weakens and reaches the set threshold earlier, which reduces the switching threshold and performs the switching in advance.

At S290, the switching instruction fed back by the base station according to the report information is received, and the network switching operation is performed according to the switching instruction.

The base station performs switching determination after receiving the report information, so as to determine which candidate frequency point to switch to. The switching instruction is used for indicating the selected candidate frequency point and information needed by the UE to connect with the candidate frequency point, such as a carrier frequency, target power and other wireless resource and physical resource configuration information. After receiving the switching instruction, the UE responds to the switching instruction to complete the network switching operation.

In the above mobile communication network switching method, the measurement configuration message sent by the base station is received, the candidate frequency point corresponding to the measurement object identifier in the measurement configuration message is measured, when the signal strength parameter of the mobile communication signal of the current frequency point meets the preset condition in a call state, according to the strength change trend of the mobile communication signal, the signal strength parameter of the at least one candidate frequency point meeting the switching condition is increased in the same trend, the measurement object identifier and the signal strength parameter increased in the same trend of the at least one candidate frequency point meeting the switching condition are reported to the base station, and the switching instruction fed back by the base station is received for network switching. Since the signal strength parameter of the at least one candidate frequency point meeting the switching condition is increased in the same trend, that is, when the strength of the mobile communication signal becomes weak, the signal strength parameter reported to the base station will further weaken compared with the actually measured signal strength parameter, which reduces a switching threshold and performs the switching in advance, so as to avoid the situation that the UE is disconnected before the network switching is completed due to the rapid change of the mobile communication signals during the call and improve the call quality.

In some embodiments, the signal strength parameter of the mobile communication signal includes Reference Signal Receiving Power (RSRP). That is, the UE monitors the RSRP of the mobile communication signal of the current frequency point, and when the RSRP of the mobile communication signal meets the preset condition, increases the RSRP of the at least one candidate frequency point meeting the switching condition in the same trend.

When the UE parses a voice signal during a voice call, a Modem (communication component) bottom layer performs a series of processing to a signal of the base station, such as filtering, amplification, filtering, down-conversion and digital-to-analog conversion. In this process, RSRP measurement of the mobile communication signal is completed synchronously, and the RSRP is reported to the base station or an upper layer application as required. The whole process forms a package. Therefore, the UE monitors the RSRP of the mobile communication signal by directly calling measurement data of the Modem monitor the RSRP of mobile communication signal, which is convenient and fast.

Figure 3:
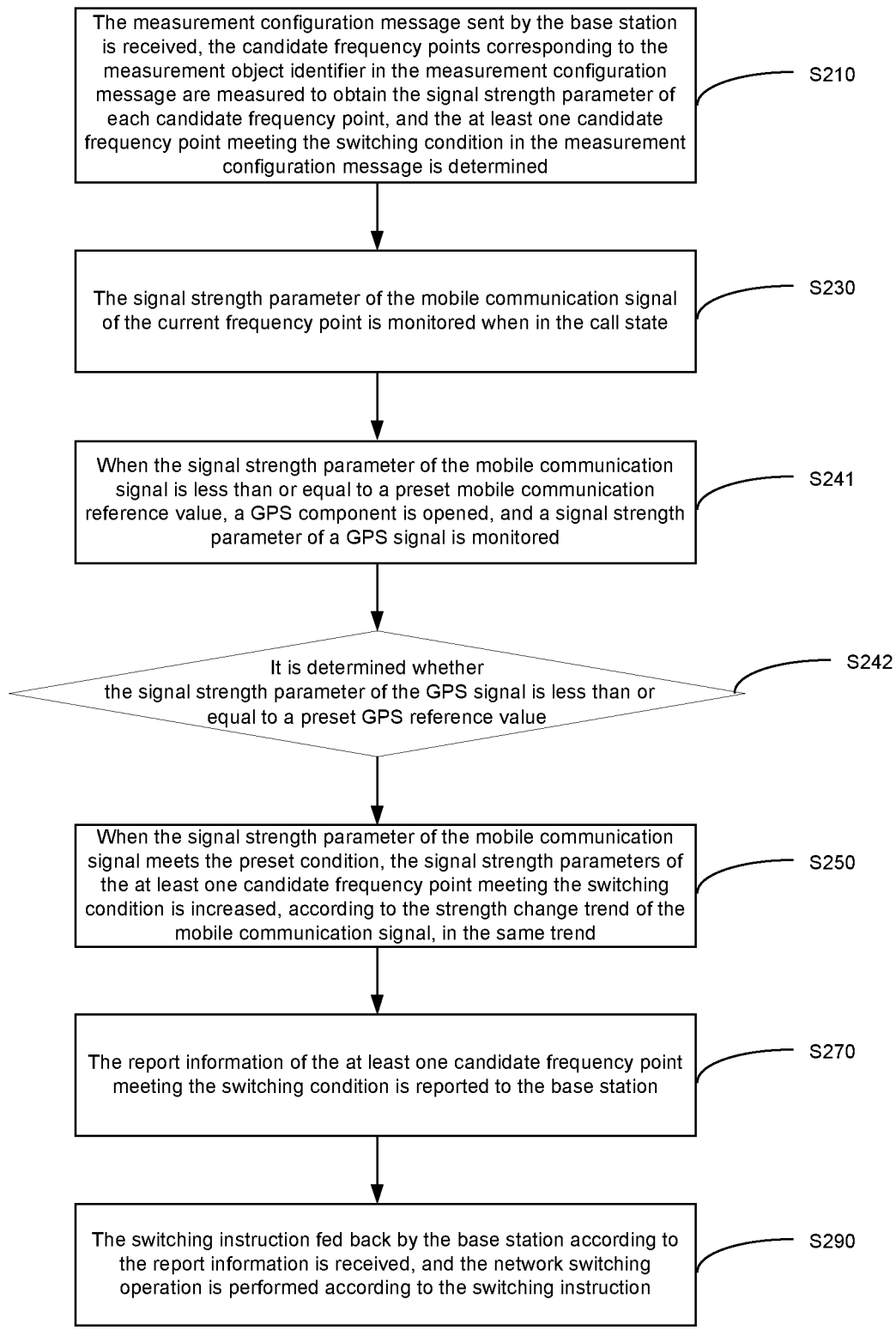
FIG. 3 is a flowchart of a mobile communication network switching method according to another embodiment of the present disclosure.

In some embodiments, referring to FIG. 3, after S230 and before S250, the method further includes S241 and S242.

At S241, when the signal strength parameter of the mobile communication signal is less than or equal to a preset mobile communication reference value, a Global Positioning System (GPS) component is opened, and a signal strength parameter of a GPS signal is monitored.

The preset mobile communication reference value is a value representing the signal strength of the mobile communication signal, which is set according to actual needs, specifically is set as a critical value between values representing good strength and bad strength of the mobile communication signal. When the signal strength parameter of the mobile communication signal is less than or equal to the preset mobile communication reference value, then the strength of the mobile communication signal is bad.

For example, taking that the signal strength parameter of the mobile communication signal is the RSRP and the preset mobile communication reference value is S as an example, the UE compares the RSRP with the S of the mobile communication signal, and when the RSRP is less than or equal to the S, opens the GPS component and monitors the signal strength parameter of the GPS signal At S242, it is determined whether the signal strength parameter of the GPS signal is less than or equal to a preset GPS reference value.

The preset GPS reference value is a value representing the signal strength of the GPS signal, which is set according to actual needs, specifically is set as a critical value between the values representing the good strength and the bad strength of the GPS signal. When the signal strength parameter of the GPS signal is less than or equal to the preset GPS reference value, then the strength of the GPS signal is bad, and at this time, S250 is performed.

GPS is usually used for outdoor positioning. For indoor, garage, tunnel, etc., due to the obstruction of buildings, especially the obstruction of multiple walls, it is difficult to receive enough satellite signals for positioning, and even the satellite signals can be received, it is difficult to meet requirements due to the lack of accuracy. For the GPS signal, since the satellite is dozens of kilometers away from the earth, the UE is in a far field compared with the GPS satellite. In an open field, the GPS signal is less affected by the position, while in a closed environment, the GPS signal is more affected by the position. Through comparing the signal strength parameter of the GPS signal with the preset GPS reference value, it can be roughly deduced whether the UE is in an open environment or a relatively closed environment with obstacles. When the signal strength parameter of the GPS signal is less than or equal to the preset GPS reference value, it means that the UE is in the relatively closed environment with obstacles and there is a need for network switching, then S250 is performed. In this way, the analysis of the position of the UE combined with the GPS signal can accelerate the network switching in the relatively closed environment with obstacles, so as to improve the call quality in the relatively closed environment with obstacles. Specifically, when the signal strength parameter of the GPS signal is greater than the preset GPS reference value, it is determined that the UE is in a relatively open environment, and a network switching process is performed according to the traditional mechanism.

In some embodiments, the signal strength parameter of the GPS signal includes Received Signal Strength Indicator (RSSI).

The RSSI indicates strength of a signal. Through monitoring the RSSI of the GPS signal, the relationship between the GPS signal and the preset GPS reference value can be accurately analyzed. For example, taking that the signal strength parameter of the GPS signal is the RSSI and the preset GPS reference value is G as an example, the UE compares the RSSI and the G of the GPS signal, and when the RSSI is less than or equal to the G, S250 is performed.

In some embodiments, S210 includes that: according to an ascending order of frequencies of the candidate frequency points corresponding to the measurement object identifier in the measurement configuration message, the candidate frequency points are measured in turn to obtain the signal strength parameter of each candidate frequency point, and the at least one candidate frequency point meeting the switching condition in the measurement configuration message are determined.

Each measurement object identifier is associated with a candidate frequency point, and each candidate frequency point corresponds to a frequency. It can be seen from c (velocity of light)=frequency*wavelength that the frequency is inversely proportional to the wavelength. The longer the wavelength is, the lower the frequency is. Generally speaking, for a wireless signal, the longer the wavelength is, the stronger the diffraction ability is, and the shorter the wavelength is, the weaker the diffraction ability is. Therefore, the lower the frequency is, the stronger the diffraction ability is. Through measuring the candidate frequency points in turn according to an ascending order of frequencies, the candidate frequency points with strong diffraction ability are measured first. Based on experience, the stronger the diffraction ability is, the more likely the switching condition is to be met, and if so, a time period of scanning the at least one candidate frequency point meeting the switching condition can be shortened as much as possible, and the UE can be reported to the base station as soon as possible, so as to perform switching as soon as possible. Shortening the time period from measuring to performing switching further avoids disconnection before the network switching is completed, and improves the call quality.

For example, the alternate frequency points are numbered from 1 to 10, based on that the frequency of the candidate frequency point 10 is between the candidate frequency point 3 and the candidate frequency point 4 (higher than the frequency point 3 and lower than the candidate frequency point 4), when the traditional measurement sequence is followed, the UE has to completely test the previous 9 candidate frequency points before the candidate frequency point 10, but in the present embodiment, the measurement sequence is changed to 1, 2, 3, 10 . . . , then the time period to measure the candidate frequency point 10 is shortened.

In some embodiments, when a frequency is less than or equal to a preset frequency, the frequency is low frequency band; when a frequency is greater than the preset frequency, the frequency is high frequency band. The frequencies of the candidate frequency points are divided into low frequency band and high frequency band. An operation of S210 includes that: according to the ascending order of frequencies of the candidate frequency points corresponding to the measurement object identifier in the measurement configuration message, the candidate frequency points in each low frequency band are measured in turn, the signal strength parameter of each candidate frequency point in the low frequency band is obtained, and the at least one candidate frequency point meeting the switching condition in the low frequency band is determined. When there is no candidate frequency point meeting the switching condition in the low frequency band, then according to the ascending order of frequencies, the candidate frequency points in each high frequency band are measured in turn, the signal strength parameter of each candidate frequency point in the high frequency band is obtained, and the at least one candidate frequency point meeting the switching condition in the high frequency band is determined.

The measurement process is optimized by measuring in different frequency bands, giving priority to the measurement of the low frequency band, and further measuring the high frequency band when the low frequency band is not satisfied. There is no need to make all measurements at the same time.

In some embodiments, the preset condition includes that: the signal strength parameter of the mobile communication signal drops and a drop speed is greater than or equal to a preset speed, so that the dropped signal strength parameter of the mobile communication signal is less than or equal to a preset mobile communication critical value.

The preset speed and the preset mobile communication critical value are set according to actual needs. The preset mobile communication critical value is the value representing the signal strength of the mobile communication signal. Specifically, when the drop of the signal strength parameter of the mobile communication signal is detected, the UE calculates the drop speed of the signal strength parameter of the mobile communication signal. When the drop speed is greater than or equal to the preset speed, the UE compares the dropped signal strength parameter of the mobile communication signal with the preset mobile communication critical value. When the dropped signal strength parameter of the mobile communication signal is less than or equal to the preset mobile communication critical value, it means that the signal strength parameter of the mobile communication signal meets the preset condition.

When the UE is in a cell, the mobile communication signal of the UE is related to a series of changes, such as a distance between the UE and the base station, an environment where the UE is located, and fading caused by movement. Generally, the mobile communication signal of the UE is in an unstable state, and the accuracy of determining the strength of the mobile communication signal affects the accuracy of network switching. When the mobile communication signal drops, it is determined whether the preset condition is met by comparing the drop speed and the dropped signal strength parameter with the preset mobile communication critical value, in this way, the accuracy of determining the strength of the mobile communication signal is high, which may improve the accuracy of network switching.

For example, taking that the preset mobile communication critical value is S2 and the preset speed is y, when the signal strength parameter of the mobile communication signal drops, the drop speed is greater than or equal to y, and the dropped signal strength parameter of the mobile communication signal is less than or equal to S2, the signal strength parameter of the at least one candidate frequency point meeting the switching condition is increased in the same trend, and the UE fills the measurement result in the MeasurementReport message and sends the MeasurementReport message to the base station. The base station issues a switch execution instruction to perform switching.

Specifically, the preset mobile communication critical value is less than the preset mobile communication reference value, that is, S>S2. When in a call state, after the UE monitors the signal strength parameter of the mobile communication signal of the current frequency point, in a case that the signal strength parameter of the mobile communication signal is less than or equal to S, the UE opens the GPS component. The UE determines whether the signal strength parameter of the GPS signal is less than or equal to the preset GPS reference value. When determining that the signal strength parameter of the GPS signal is less than or equal to the preset GPS reference value and the drop of the signal strength parameter of the mobile communication signal is detected, the UE calculates the drop speed of the signal strength parameter of the mobile communication signal. When the drop speed is greater than or equal to the preset speed, the UE compares the signal strength parameter of the mobile communication signal after the drop with S2. When the signal strength parameter of the mobile communication signal after the drop is less than or equal to S2, it means that the signal strength parameter of the mobile communication signal meets the preset condition.

In some embodiments, the preset condition includes that: the signal strength parameter of the mobile communication signal drops and a drop speed is greater than or equal to the preset speed, and the value obtained by adjusting the dropped signal strength parameter of the mobile communication signal is less than or equal to the preset mobile communication critical value. The value obtained by adjusting the dropped signal strength parameter of the mobile communication signal is the value obtained by increasing, according to the change trend of the strength drop of the mobile communication signal, the dropped signal strength parameter of the mobile communication signal in the same trend.

The operation that according to the change trend of the strength drop of the mobile communication signal, the dropped signal strength parameter of the mobile communication signal is increased in the same trend includes that: the dropped signal strength parameter of each mobile communication signal further weakens. For example, when the dropped signal strength parameter of the mobile communication signal is −60 dbm (decibel milliwatt), then after increased in the same trend, the signal strength parameter is −80 dBm.

Specifically, when the drop of the signal strength parameter of the mobile communication signal is detected, the UE calculates the drop speed of the signal strength parameter of the mobile communication signal. When the drop speed is greater than or equal to the preset speed, the UE increases the dropped signal strength parameter of the mobile communication signal in the same trend, and compares the signal strength parameter of the mobile communication signal increased in the same trend with the preset mobile communication critical value. When the signal strength parameter of the mobile communication signal increased in the same trend is less than or equal to the preset mobile communication critical value, it means that the signal strength parameter of the mobile communication signal meets the preset condition. Specifically, as described above, the preset mobile communication critical value is less than the preset mobile communication reference value.

When the signal strength parameter of the mobile communication signal is increased in the same trend, the value compared with the preset mobile communication critical value will further weaken compared with the actually measured signal strength parameter. When the actual signal strength parameter is greater than the preset mobile communication critical value, since the signal strength parameter increased in the same trend is smaller than the actual signal strength parameter, the condition that the signal strength parameter is less than or equal to the preset mobile communication critical value is fulfilled in advance, so as to further avoid the situation of disconnection before the network switching is completed and improve the call quality.

In some embodiments, at S250, the operation that according to the strength change trend of the mobile communication signal, the signal strength parameter of the at least one candidate frequency point meeting the switching condition is increased in the same trend includes that: an offset is calculated according to a preset switching advance time period and the drop speed, the offset being positively correlated with the drop speed, and the drop speed being negative; and a value obtained by increasing the signal strength parameter of each candidate frequency point meeting the switching condition by the offset is respectively calculated to obtain the signal strength parameter, increased in the same trend, of each candidate frequency point meeting the switching condition.

The preset switching advance time period is set according to actual needs. The drop speed is negative, and the offset is the same as the positive and negative signs of the drop speed, that is, the offset is also negative, so the value obtained by increasing the signal strength parameter of the candidate frequency point by the offset is smaller than the signal strength parameter of the actual candidate frequency point.

The drop speed is an actual change value of the signal strength parameter. Through calculating the offset according to the preset switching advance time period and the drop speed, the offset changes with the change of the drop speed, so the value that needs to be adjusted is accurately reflected. Specifically, the UE calculates the offset by multiplying the preset switching advance time period by the drop speed, that is, calculate D=y1*t, where D is the offset, y1 is the drop speed, and t is the preset switching advance time period. It is understandable that, in other embodiments, other calculation formulas may also be used as long as the offset is positively correlated with the drop speed.

Similarly, in some embodiments, the value obtained by increasing, according to the change trend of the strength drop of the mobile communication signal, the dropped signal strength parameter of the mobile communication signal in the same trend is the value obtained by calculating the offset according to the preset switching advance time period and the drop speed, and increasing the dropped signal strength parameter of the mobile communication signal by the offset. That is, the preset condition may include that: the signal strength parameter of the mobile communication signal drops and the drop speed is greater than or equal to the preset speed, and the value obtained by increasing the dropped signal strength parameter of the mobile communication signal by the offset which is calculated according to the preset switching advance time period and the drop speed is less than or equal to the preset mobile communication critical value.

For example, taking the numbers from 0 dBm to −100 dBm (dBm is a signal strength element, and dB is a difference value element) for example, it is assumed that the UE changes at a speed of −5 dB/S during movement. In the measurement configuration message issued by the base station, when the signal strength parameter is less than or equal to −80 dbm, the preset condition is satisfied and reporting is triggered. It takes 5 seconds to complete the whole network switching process. In the actual mobile communication network, when the signal strength parameter reaches −100 dbm, the signal quality is poor enough to lose connection. According to the traditional switching process, since −80+(−5*5)=−105 (dBm), that is, before the switching is completed, the signal is weak enough to lose connection. In some embodiments, it is assumed that the preset switching advance time period is 4 seconds, the signal strength parameter of the mobile communication signal is increased in the same trend, and the increased offset is −5*4=−20 (dB) (the parameter at the base station remains unchanged), then the signal strength parameter is reported as −80 dbm when the dropped signal strength parameter of the mobile communication signal is −60 dbm, and other reported results of the intra-frequency measurement, the inter-frequency measurement and the inter-system measurement are all increased by the offset −20, which achieves the preset condition. However, the actual signal strength parameter is −60 dbm, after the whole switching process is completed, the actual signal strength parameter is −60−5*5=−85 (dBm), which is greater than −100 dbm. The switching is completed normally before the signal fades to −100 dbm, so the problem of losing connection before switching will not arise. Specifically, after the network switching is completed, the offset is removed from the parameters reported to the base station by the UE to avoid causing too many other problems.

It is understandable that, in other embodiments, the operation that according to the strength change trend of the mobile communication signal, the signal strength parameter of the at least one candidate frequency point meeting the switching condition is increased in the same trend may also be executed by other ways. For example, according to the strength change trend of the mobile communication signal, the signal strength parameter of the at least one candidate frequency point meeting the switching condition is increased by the offset set corresponding to the change trend. Specifically, when the change trend is weakening, the value of the offset is negative; when the change trend is increasing, the value of the offset is positive.

Specifically, for the measurement of the candidate frequency point by the UE, measurement control (Event A1 to Event A5 or Event B1 and Event B2) information is generally carried in an RRConnectionReconfiguration message (specifically depending on each mobility management algorithm and redistribution distribution strategy), and the UE measures neighboring cells and service cells according to the information and instructions in the RRConnectionReconfiguration message. When a signal condition meets events A or events B, the UE reports the cell meeting the switching condition to the base station, and after determining that the signal condition meets the switching threshold, the base station applies for resources and configuration information to a target cell until the interaction between a source cell and the target cell gets the response. After that, the switching is completed when the UE sends a reconfiguration completion message. The events A include Event A1 to Event A5, and the events B include Event B1 and Event B2.

Event A1 is that when the value of the RSRP of the service cell is higher than an absolute threshold value, an A1 measurement report is output.

Event A2 is that when the value of the RSRP of the service cell is lower than the absolute threshold value, an A2 measurement report is output.

Event A3 is that when the value of the RSRP of the neighboring cell is higher than the value of the RSRP of the service cell, an A3 measurement report is output.

Event A4 is that when the value of the RSRP of the neighboring cell is higher than the absolute threshold value, an A4 measurement report is output.

Event A5 is that when the value of the RSRP of the service cell is lower than the absolute threshold value 1 and the value of the RSRP of the neighboring cell is higher than the absolute threshold value 2, an A5 measurement report is output.

Event B is that when the value of the RSRP of the neighboring cell is higher than the absolute threshold value, a B1 measurement report is output.

Event B2 is that when the value of the RSRP of the service cell is lower than the absolute threshold value 1 and the value of the RSRP of the neighboring cell is higher than the absolute threshold value 2, a B2 measurement report is output.

Specifically, the switching conditions of the measurement configuration information are divided into the condition of intra-system switching and the condition of inter-system switching, which are respectively as follows:

the condition of intra-system switching, which is that the quality of the neighboring cell is higher than the quality of the service cell by a threshold, and the neighboring cell is used for intra-frequency or inter-frequency coverage-based switching; an event entry condition, which is Mn−Offset−Hys>Ms, where $$Offset = a3\text{-offset} + Ofs + Ocs - Ofn - Ocn.$$

Mn is the measurement result of the neighboring cell without considering the calculation of any offset.

Ofn is a specific offset of the frequency of the neighboring cell (that is, offsetFreq is defined in measObjectEUTRA as the frequency corresponding to the neighboring cell).

Ocn is a cell individual offset of the neighboring cell (that is, cellIndividualOffset is defined in measObjectEUTRA as the frequency corresponding to the neighboring cell), at the same time, when Ocn is not configured for the neighboring cell, Ocn is set as 0.

Ms is the measurement result of the service cell without calculating any offset.

Ofs is a specific offset of the frequency of the service cell (that is, offsetFreq is defined in measObjectEUTRA as the frequency corresponding to the service cell).

Ocs is a cell individual offset of the service cell (that is, cellIndividualOffset is defined in measObjectEUTRA as the frequency corresponding to the service cell), and Ocs it is not configured for the service cell, Ocs is set as 0.

Hys is a hysteresis parameter of the event (that is, hysteres is the parameter defined for the event in reportConfigEUTRA).

a3-Offset is an offset parameter of the event (that is, a3-Offset is the parameter defined for the event in reportConfigEUTRA).

The unit of Ofn, Ocn, Ofs, Ocs, Hys and Offset is dB.

The condition of inter-system switching is that the quality of the service cell is lower than the absolute threshold value 1 (Serving<threshold1) and the quality of the neighboring cell is higher than the absolute threshold value 2 (Serving>threshold2). The conditions are used for the measurement of the same or low-priority cells.

Specifically, the network switching operation is actually an interactive process between the UE and the base station at a communication protocol level, and the whole process must be operated according to the specification of 3rd Generation Partnership Project (3GPP). The network switching operations performed by the UE include intra-system switching and inter-system switching. For the intra-system switching, when the source cell where the UE is located and the target cell to switch do not belong to the same base station, switching between the base stations occurs.

1) The base station of the source cell issues measurement control to the UE, and configures a measurement type of the UE through an RRCConnectionReconfigration message.

2) The UE performs measurement configuration at an RRC protocol end of the UE according to the measurement control issued by the base station, and sends an RRCConnectionReconfigrationComplete message to the base station to indicate that the measurement configuration is completed.

3) The UE reports the measurement report to the base station according to the measurement configuration.

4) The base station of the source cell determines according to the measurement report, and determines that the corresponding UE switches between the base stations.

5) The base station of the source cell sends a HANDOVERREQUEST message to the target base station, so as to instruct the target base station to prepare for switching.

6) The target cell conducts resource access, and allocates radio resources and SAE bearers resources of services for the access of the UE.

7) After the resource access of the target cell is successful, a HANDOVRREQUESTACKNOWLEDGE message is sent to the base station of the source cell to indicate that the switching preparation is completed.

8) The base station of the source cell sends the RRCConnectionReconfigration message to the UE, so as to instruct the UE to perform a switching action.

9) The UE sends the RRCConnectionReconfigration-Complete message to the base station of the target cell to indicate that the UE has accessed to a new cell.

10) The base station of the target cell sends a PATH SWITCH REQUEST message to a Mobility Management Entity (MME), so as to request the MME to update a node address of a service data channel.

11) The MME updates the node address of the service data channel successfully, and sends a PATH SWITCHREQUEST ACKNOWLEDGE message to the base station of the target cell to indicate that service communication may be performed on new SAE bearers.

12) The UE has accessed to the new cell and can perform the service communication in the new cell, it is needed to release the resources occupied in the source cell, and then the base station of the target cell sends a UE CONTEXTRELEASE message to the base station of the source cell.

13) The base station of the source cell releases the context of the corresponding UE, including the radio resources and the SAE bear resources.

For the inter-system switching, the UE sends the measurement report to the base station, and then the base station decides whether to perform the switching according to the content of the report and Radio Resource Management (RRM) information, and sends a switching target to the UE through a Ho from E-UTRAN command message. In the preparation stage, radio parameters established by the target cell are transferred to the UE through the message, and the UE accesses to the target cell, and sends a handover to UTRAN complete message to a Radio Network Controller (RNC) to complete the handover.

No matter for the intra-system switching or the inter-system switching, it can be roughly summarized as follows: the base station issues the measurement configuration message, the UE reports the measurement result, the base station makes a decision, prepares resources, and issues relevant information to the UE. The UE completes access according to the relevant information issued by the base station.

It should be understood that although the steps in the flowcharts in FIG. 2 to FIG. 3 are shown in order as indicated by the arrows, they are not necessarily performed in the order indicated by the arrows. Unless explicitly stated in the present disclosure, there is no strict order in which these steps are performed, and they can be performed in any other order. Furthermore, at least a part of steps in FIG. 2 to FIG. 3 may include multiple sub-steps or multiple stages. These sub-steps or phases are not necessarily performed at the same time, but may be performed at different times. These sub-steps or stages are not necessarily performed in order, but may be performed in turn or alternately with at least a part of other steps or sub-steps or phases of the other steps.

Figure 4:
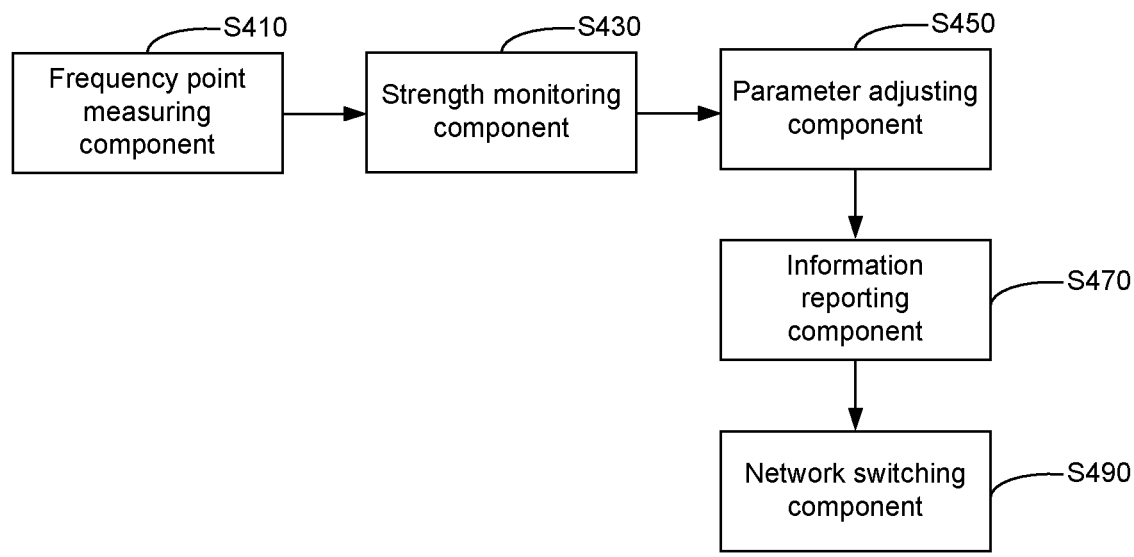
FIG. 4 is a structural block diagram of a mobile communication network switching apparatus according to an embodiment of the present disclosure.

In some embodiments, as shown in FIG. 4, a mobile communication network switching apparatus is provided, which includes: a frequency point measuring component 410, a strength monitoring component 430, a parameter adjusting component 450, an information reporting component 470 and a network switching component 490.

The frequency point measuring component 410 is configured to receive the measurement configuration message sent by the base station, measure the candidate frequency points corresponding to the measurement object identifier in the measurement configuration message to obtain the signal strength parameter of each candidate frequency point, and determine at least one candidate frequency point meeting the switching condition in the measurement configuration message. The strength monitoring component 430 is configured to monitor the signal strength parameter of the mobile communication signal of the current frequency point when in the call state. The parameter adjusting component 450 is configured to increase, when the signal strength parameter of the mobile communication signal meets the preset condition, the signal strength parameter of the at least one candidate frequency point meeting the switching condition in the same trend according to the strength change trend of the mobile communication signal. The information reporting component 470 is configured to report the report information of the at least one candidate frequency point meeting the switching condition to the base station, the report information including the measurement object identifier and the signal strength parameter increased in the same trend. The network switching component 490 is configured to receive the switching instruction fed back by the base station, the switching instruction being determined, by the base station, according to the report information, and perform the network switching operation according to the switching instruction.

Through the above mobile communication network switching device, the measurement configuration message sent by the base station is received, the candidate frequency point corresponding to the measurement object identifier in the measurement configuration message is measured, when the signal strength parameter of the mobile communication signal of the current frequency point meets the preset condition in a call state, according to the strength change trend of the mobile communication signal, the signal strength parameter of the at least one candidate frequency point meeting the switching condition is increased in the same trend, the measurement object identifier and the signal strength parameters increased in the same trend of the at least one candidate frequency point meeting the switching condition are reported to the base station, and the switching instruction fed back by the base station is received for network switching. Since the signal strength parameter of the at least one candidate frequency point meeting the switching condition is increased in the same trend, that is, when the strength of the mobile communication signal becomes weak, the signal strength parameter reported to the base station will further weaken compared with the actually measured signal strength parameter, which reduces a switching threshold and performs the switching in advance, so as to avoid the situation that the UE is disconnected before the network switching is completed due to the rapid change of the mobile communication signals during the call and improve the call quality.

In some embodiments, the mobile communication network switching device further includes an environment detecting component (not shown in the figures), which is configured to open, after the strength monitoring component 430 monitors the signal strength parameter of the mobile communication signal of the current frequency point and when the signal strength parameter of the mobile communication signal is less than or equal to a preset mobile communication reference value, the GPS component, and monitor a signal strength parameter of a GPS signal. When the signal strength parameter of the GPS signal is less than or equal to the preset GPS reference value, the parameter adjusting component 450 performs a corresponding function.

Through analyzing the position of the UE combined with the GPS signal, the network switching in the relatively closed environment with obstacles can be accelerated, so as to improve the call quality in the relatively closed environment with obstacles.

In some embodiments, the frequency point measuring component 410 is configured to measure, according to an ascending order of frequencies of the candidate frequency points corresponding to the measurement object identifier in the measurement configuration message, the candidate frequency points in turn to obtain the signal strength parameter of each candidate frequency point, and determine the at least one candidate frequency point meeting the switching condition in the measurement configuration message.

Through measuring the candidate frequency points in turn according to an ascending order of frequencies, the candidate frequency points with strong diffraction ability may be measured first. Based on experience, the stronger the diffraction ability is, the more likely the switching condition is to be met, and if so, the time period of scanning the candidate frequency points meeting the switching condition can be shortened as much as possible, and it can be reported to the base station as soon as possible, so as to perform switching as soon as possible. Shortening the time period from measuring to performing switching further avoids disconnection before the network switching is completed, and improves the call quality.

In some embodiments, the preset condition includes that: the signal strength parameter of the mobile communication signal drops and a drop speed is greater than or equal to a preset speed, so that the dropped signal strength parameter of the mobile communication signal after the drop is less than or equal to a preset mobile communication critical value.

When the mobile communication signal drops, it is determined whether the preset condition is met by comparing the drop speed and the signal strength parameter after the drop with the preset mobile communication critical value, in this way, the accuracy of determining the strength of the mobile communication signal is high, which may improve the accuracy of network switching.

In some embodiments, the preset condition includes that: the signal strength parameter of the mobile communication signal drops and a drop speed is greater than or equal to the preset speed, and a value obtained by adjusting the dropped signal strength parameter of the mobile communication signal is less than or equal to a preset mobile communication critical value. The value obtained by adjusting the dropped signal strength parameter of the mobile communication signal is a value obtained after increasing, according to the change trend of the strength drop of the mobile communication signal, the dropped signal strength parameter of the mobile communication signal after the drop in the same trend.

Through comparing the value obtained by increasing the dropped signal strength parameter of the mobile communication signal in the same trend with the preset mobile communication critical value, the condition that the value is less than or equal to the preset mobile communication critical value can be achieved in advance, which further avoids the situation of losing connection before the network switching is completed and improves the call quality.

In some embodiments, the operation that according to the strength change trend of the mobile communication signal, the parameter adjusting component 450 increases the signal strength parameter of the at least one candidate frequency point meeting the switching condition in the same trend includes that: the offset is calculated according to the preset switching advance time period and the drop speed, the offset being positively correlated with the drop speed, and the drop speed being negative; and a value obtained by increasing the signal strength parameters of each candidate frequency point meeting the switching condition by the offset is respectively calculated to obtain the signal strength parameter, increased in the same trend, of each candidate frequency point meeting the switching condition.

Through calculating the offset according to the preset switching advance time period and the drop speed, the offset can change with the change of the drop speed, so the value that needs to be adjusted can be accurately reflected.

For the specific limitations of the mobile communication network switching apparatus, please refer to the above limitations of the mobile communication network switching method, which will not be repeated here. Each component in the mobile communication network switching device may be realized in whole or in part by software, hardware and their combination. Each above component may be embedded in or independent of a processor in the UE in the form of hardware, or stored in a memory in the UE in the form of software, so that the processor may call and perform the operation corresponding to each component above.

Figure 5:
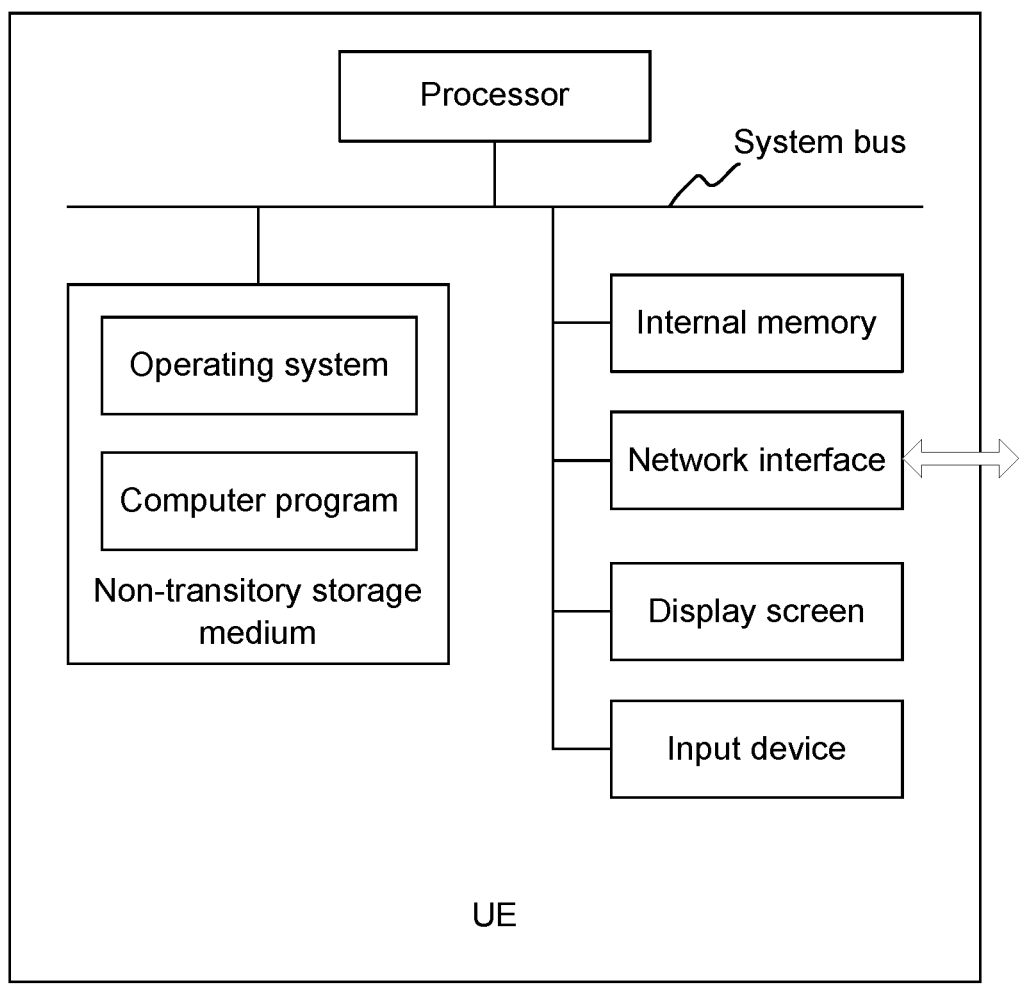
FIG. 5 is an internal structural diagram of UE according to an embodiment of the present disclosure.

In some embodiments, UE is further provided, and an internal structure diagram of the UE is shown in FIG. 5. The UE includes a processor, a memory, a network interface, a display screen and an input device connected through a system bus. The processor of the UE is used to provide computing and control capabilities. The memory of the UE includes a non-transitory storage medium and an internal memory. The non-transitory storage medium stores an operating system and a computer program. The internal memory provides an environment for the operation of the operating system and the computer program in the non-transitory storage medium. The network interface of the UE is used to communicate with an external terminal through a network connection. When executed by the processor, the computer program implements a mobile communication network switching method. The display screen of the UE may be an LCD or an e-ink display screen. The input device of the UE may be a touch layer covered on the display screen, a button, trackball or trackpad set on the case of the UE, an external keyboard, trackpad or mouse, etc.

Those skilled in the art may understand that the structure shown in FIG. 5 is a block diagram of part of the structure related to the solutions of the present disclosure and does not constitute a limitation on the UE applied to the solutions of the present disclosure. Specifically, the UE may include more or fewer parts than shown in the figures, or some combination of parts, or a different arrangement of parts.

In some embodiments, UE is further provided, which includes a memory and a processor. The memory stores a computer program. When executing the computer program, the processor implements the steps of the mobile communication network switching method.

Since the UE mentioned above implements the steps of the mobile communication network switching method, similarly, the situation that the UE is disconnected before the network switching is completed due to the rapid change of the mobile communication signals during the call may be avoided, thus improving the call quality.

In some embodiments, a computer-readable storage medium is provided, which stores a computer program. When executed by a processor, the computer program implements the steps of the mobile communication network switching method.

Since the computer-readable storage medium mentioned above implements the steps of the mobile communication network switching method, similarly, the situation that the UE is disconnected before the network switching is completed due to the rapid change of the mobile communication signals during the call may be avoided, thus improving the call quality.

Those ordinary skilled in the art may understand that all or a part of flows of the method in the above embodiments may be completed by related hardware instructed by a computer program. The computer program may be stored in a non-transitory computer readable storage medium. When executed, the computer program may include the flows in the embodiments of the method. Any reference to memory, storage, database or other media used in each embodiment provided in the present disclosure may include non-transitory and/or transitory memories. The non-transitory memories may include a Read-Only Memory (ROM), a Programmable Read-Only Memory (PROM), an Electrically Programmable Read-Only Memory (EPROM), an Electrically Erasable Programmable Read-Only Memory (EEPROM) or a flash memory. The transitory memories may include a Random Access Memory (RAM) or an external cache memory. As an illustration rather than a limitation, the RAM is available in many forms, such as Static RAM (SRAM), Dynamic RAM (DRAM), Synchronous DRAM (SDRAM), Double Data Rate SDRAM (DDRAM), Enhanced SDRAM (ESDRAM), Synchlink DRAM (SLDRAM), Rambus Direct RAM (RDRAM), Direct Memory Bus Dynamic RAM (DRDRAM), and Memory Bus Dynamic RAM (RDRAM).

The technical characteristics of the above embodiments can be combined at random. To make the description concise, not all possible combinations of these technical characteristics of the above embodiments are described, however, all the combinations of these technical characteristics shall fall within the scope of the specification, as long as there is no contradiction in the combinations of these technical characteristics.

The above embodiments express several implementation modes of the present disclosure. The descriptions of these embodiments are more specific and detailed, but they cannot be understood as a limitation to the claimed scope of the disclosure. It should be pointed out that those of ordinary skill in the art can also make several improvements and modifications without departing from the conception of the present disclosure, and these improvements and modifications should fall within the protection scope of protection of the present disclosure. Therefore, the protection scope of the present disclosure is subject to the attached claims.

What is claimed is:

1. A mobile communication network switching method, comprising:

receiving a measurement configuration message sent by a base station, measuring candidate frequency points corresponding to a measurement object identifier in the measurement configuration message to obtain a signal strength parameter of each candidate frequency point, and determining at least one candidate frequency point meeting a switching condition in the measurement configuration message;

monitoring a signal strength parameter of a mobile communication signal of a current frequency point when in a call state;

when the signal strength parameter of the mobile communication signal meets a preset condition, increasing, according to a strength change trend of the mobile communication signal, a signal strength parameter of the at least one candidate frequency point meeting the switching condition in the same trend;

reporting report information of the at least one candidate frequency point meeting the switching condition to the base station, the report information comprising the measurement object identifier and the signal strength parameter increased in the same trend; and receiving a switching instruction fed back by the base station, the switching instruction being determined, by the base station, according to the report information, and performing a network switching operation according to the switching instruction.

2. The method as claimed in claim 1, wherein after monitoring the signal strength parameter of the mobile communication signal of the current frequency point when in the call state, and before when the signal strength parameter of the mobile communication signal meets the preset condition, increasing, according to the strength change trend of the mobile communication signal, the signal strength parameter of the at least one candidate frequency point meeting the switching condition in the same trend further comprises:

when the signal strength parameter of the mobile communication signal is less than or equal to a preset mobile communication reference value, opening a Global Positioning System (GPS) component, and monitoring a signal strength parameter of a GPS signal;

when the signal strength parameter of the GPS signal is less than or equal to a preset GPS reference value, performing the operation that when the signal strength parameter of the mobile communication signal meets the preset condition, increasing, according to the strength change trend of the mobile communication signal, the signal strength parameter of the at least one candidate frequency point meeting the switching condition in the same trend.

3. The method as claimed in claim 1, wherein measuring the candidate frequency points corresponding to the measurement object identifier in the measurement configuration message to obtaining the signal strength parameter of each candidate frequency point, and determining the at least one candidate frequency point meeting the switching condition in the measurement configuration message comprises:

measuring, according to an ascending order of frequencies of the candidate frequency points corresponding to the measurement object identifier in the measurement configuration message, the candidate frequency points in turn to obtain the signal strength parameter of each candidate frequency point, and determining the at least one candidate frequency point meeting the switching condition in the measurement configuration message.

4. The method as claimed in claim 1, wherein the preset condition comprises that: the signal strength parameter of the mobile communication signal drops and a drop speed is greater than or equal to a preset speed, so that the dropped signal strength parameter of the mobile communication signal is less than or equal to a preset mobile communication critical value.

5. The method as claimed in claim 1, wherein the preset condition comprises that: the signal strength parameter of the mobile communication signal drops and a drop speed is greater than or equal to the preset speed, and a value obtained by adjusting the dropped signal strength parameter of the mobile communication signal is less than or equal to a preset mobile communication critical value;

wherein the value obtained by adjusting the dropped signal strength parameter of the mobile communication signal is a value obtained after increasing the dropped signal strength parameter of the mobile communication signal according to a change trend of strength drop of the mobile communication signal.

6. The method as claimed in claim 4, wherein increasing, according to the strength change trend of the mobile communication signal, the signal strength parameter of the at least one candidate frequency point meeting the switching condition in the same trend comprises:

calculating an offset according to a preset switching advance time period and the drop speed, the offset being positively correlated with the drop speed, and the drop speed being negative; and respectively calculating a value obtained by increasing the signal strength parameter of each candidate frequency point meeting the switching condition by the offset to obtain the signal strength parameter, increased in the same trend, of each candidate frequency point meeting the switching condition.

7. The method as claimed in claim 5, wherein increasing, according to the strength change trend of the mobile communication signal, the signal strength parameter of the at least one candidate frequency point meeting the switching condition in the same trend comprises:
  calculating an offset according to a preset switching advance time period and the drop speed, the offset being positively correlated with the drop speed, and the drop speed being negative; and
  respectively calculating a value obtained by increasing the signal strength parameter of each candidate frequency point meeting the switching condition by the offset to obtain the signal strength parameter, increased in the same trend, of each candidate frequency point meeting the switching condition.

8. User Equipment (UE), comprising a memory and a processor, the memory storing a computer program, wherein when executing the computer program, the processor implements the following steps:
  receiving a measurement configuration message sent by a base station, measuring candidate frequency points corresponding to a measurement object identifier in the measurement configuration message to obtain a signal strength parameter of each candidate frequency point, and determining at least one candidate frequency point meeting a switching condition in the measurement configuration message;
  monitoring a signal strength parameter of a mobile communication signal of a current frequency point when in a call state;
  when the signal strength parameter of the mobile communication signal meets a preset condition, increasing, according to a strength change trend of the mobile communication signal, a signal strength parameter of the at least one candidate frequency point meeting the switching condition in the same trend;
  reporting report information of the at least one candidate frequency point meeting the switching condition to the base station, the report information comprising the measurement object identifier and the signal strength parameter increased in the same trend; and
  receiving a switching instruction fed back by the base station, the switching instruction being determined, by the base station, according to the report information, and performing a network switching operation according to the switching instruction.

9. The UE as claimed in claim 8, wherein the processor further implements the following steps:
  when the signal strength parameter of the mobile communication signal is less than or equal to a preset mobile communication reference value, opening a Global Positioning System (GPS) component, and monitoring a signal strength parameter of a GPS signal;
  when the signal strength parameter of the GPS signal is less than or equal to a preset GPS reference value, performing the operation that when the signal strength parameter of the mobile communication signal meets the preset condition, increasing, according to the strength change trend of the mobile communication signal, the signal strength parameter of the at least one candidate frequency point meeting the switching condition in the same trend.

10. The UE as claimed in claim 8, wherein the processor further implements the following steps:
  measuring, according to an ascending order of frequencies of the candidate frequency points corresponding to the measurement object identifier in the measurement configuration message, the candidate frequency points in turn to obtain the signal strength parameter of each candidate frequency point, and determining the at least one candidate frequency point meeting the switching condition in the measurement configuration message.

11. The UE as claimed in claim 8, wherein the preset condition comprises that: the signal strength parameter of the mobile communication signal drops and a drop speed is greater than or equal to a preset speed, so that the dropped signal strength parameter of the mobile communication signal is less than or equal to a preset mobile communication critical value.

12. The UE as claimed in claim 8, wherein the preset condition comprises that: the signal strength parameter of the mobile communication signal drops and a drop speed is greater than or equal to the preset speed, and a value obtained by adjusting the dropped signal strength parameter of the mobile communication signal is less than or equal to a preset mobile communication critical value;
  wherein the value obtained by adjusting the dropped signal strength parameter of the mobile communication signal is a value obtained after increasing the dropped signal strength parameter of the mobile communication signal according to a change trend of strength drop of the mobile communication signal.

13. The UE as claimed in claim 11, wherein the processor further implements the following steps:
  calculating an offset according to a preset switching advance time period and the drop speed, the offset being positively correlated with the drop speed, and the drop speed being negative; and
  respectively calculating a value obtained by increasing the signal strength parameter of each candidate frequency point meeting the switching condition by the offset to obtain the signal strength parameter, increased in the same trend, of each candidate frequency point meeting the switching condition.

14. A non-transitory storage medium, storing a computer program, wherein when executed by a processor, the computer program implements the following steps:
  receiving a measurement configuration message sent by a base station, measuring candidate frequency points corresponding to a measurement object identifier in the measurement configuration message to obtain a signal strength parameter of each candidate frequency point, and determining at least one candidate frequency point meeting a switching condition in the measurement configuration message;
  monitoring a signal strength parameter of a mobile communication signal of a current frequency point when in a call state;
  when the signal strength parameter of the mobile communication signal meets a preset condition, increasing, according to a strength change trend of the mobile communication signal, a signal strength parameter of the at least one candidate frequency point meeting the switching condition in the same trend;
  reporting report information of the at least one candidate frequency point meeting the switching condition to the base station, the report information comprising the measurement object identifier and the signal strength parameter increased in the same trend; and
  receiving a switching instruction fed back by the base station, the switching instruction being determined, by the base station, according to the report information, and performing a network switching operation according to the switching instruction.

15. The non-transitory storage medium as claimed in claim 14, wherein the computer program further implements the following steps:

when the signal strength parameter of the mobile communication signal is less than or equal to a preset mobile communication reference value, opening a Global Positioning System (GPS) component, and monitoring a signal strength parameter of a GPS signal;

when the signal strength parameter of the GPS signal is less than or equal to a preset GPS reference value, performing the operation that when the signal strength parameter of the mobile communication signal meets the preset condition, increasing, according to the strength change trend of the mobile communication signal, the signal strength parameter of the at least one candidate frequency point meeting the switching condition in the same trend.

16. The non-transitory storage medium as claimed in claim 14, wherein the computer program further implements the following steps:

measuring, according to an ascending order of frequencies of the candidate frequency points corresponding to the measurement object identifier in the measurement configuration message, the candidate frequency points in turn to obtain the signal strength parameter of each candidate frequency point, and determining the at least one candidate frequency point meeting the switching condition in the measurement configuration message.

17. The non-transitory storage medium as claimed in claim 14, wherein the preset condition comprises that: the signal strength parameter of the mobile communication signal drops and a drop speed is greater than or equal to a preset speed, so that the dropped signal strength parameter of the mobile communication signal is less than or equal to a preset mobile communication critical value.

18. The non-transitory storage medium as claimed in claim 14, wherein the preset condition comprises that: the signal strength parameter of the mobile communication signal drops and a drop speed is greater than or equal to the preset speed, and a value obtained by adjusting the dropped signal strength parameter of the mobile communication signal is less than or equal to a preset mobile communication critical value;

wherein the value obtained by adjusting the dropped signal strength parameter of the mobile communication signal is a value obtained after increasing the dropped signal strength parameter of the mobile communication signal according to a change trend of strength drop of the mobile communication signal.

19. The non-transitory storage medium as claimed in claim 17, wherein the computer program further implements the following steps:

calculating an offset according to a preset switching advance time period and the drop speed, the offset being positively correlated with the drop speed, and the drop speed being negative; and respectively calculating a value obtained by increasing the signal strength parameter of each candidate frequency point meeting the switching condition by the offset to obtain the signal strength parameter, increased in the same trend, of each candidate frequency point meeting the switching condition.

\* \* \* \* \*